US009403560B2

(12) United States Patent
Nakao et al.

(10) Patent No.: US 9,403,560 B2
(45) Date of Patent: Aug. 2, 2016

(54) WORK VEHICLE

(71) Applicant: KUBOTA CORPORATION, Osaka (JP)

(72) Inventors: Kohta Nakao, Osaka (JP); Yoshimi Hirooka, Osaka (JP); Takashi Kuramoto, Osaka (JP); Hiroaki Kitaguchi, Osaka (JP); Kodai Tateishi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/641,714

(22) Filed: Mar. 9, 2015

(65) Prior Publication Data

US 2016/0090130 A1 Mar. 31, 2016

(30) Foreign Application Priority Data

Sep. 30, 2014 (JP) .................................. 2014-201044

(51) Int. Cl.
*B62C 99/00* (2009.01)
*B62D 33/027* (2006.01)
*B60N 2/01* (2006.01)
*B60N 2/10* (2006.01)

(52) U.S. Cl.
CPC ................ *B62D 33/027* (2013.01); *B60N 2/01* (2013.01); *B60N 2/10* (2013.01)

(58) Field of Classification Search
CPC ........... B62D 33/027; B60N 2/01; B60N 2/10
See application file for complete search history.

(56) References Cited

U.S. PATENT DOCUMENTS

2005/0184548 A1* 8/2005 Saito ...................... B60N 2/24
                                                    296/26.09
2011/0156433 A1* 6/2011 Horiuchi ............... B60N 2/3011
                                                    296/65.09
2012/0032465 A1* 2/2012 Morita .................... B60P 3/423
                                                    296/26.09

FOREIGN PATENT DOCUMENTS

JP          2011-116318        6/2011

OTHER PUBLICATIONS

US—2016-0090057-A1, published Mar. 31, 2016 (Previously cited as U.S. Appl. No. 14/641,725.

* cited by examiner

*Primary Examiner* — Lori L Lyjak
(74) *Attorney, Agent, or Firm* — Greenblum & Bernstein, P.L.C.

(57) ABSTRACT

A work vehicle includes a driver's seat in a front section of the vehicle body. A rear seat is behind the driver's seat and includes a seat portion and a back portion. A link member is supported by the vehicle body to allow switching between a seating mode and a storage mode. The seating mode arranges the back portion behind the seat portion. The storage mode arranges the back portion in a position anterior to the position in the seating mode. A carrier bed is in a rear section of the vehicle body. The link member is disposed on an outer side and can act or function as an arm rest.

16 Claims, 9 Drawing Sheets

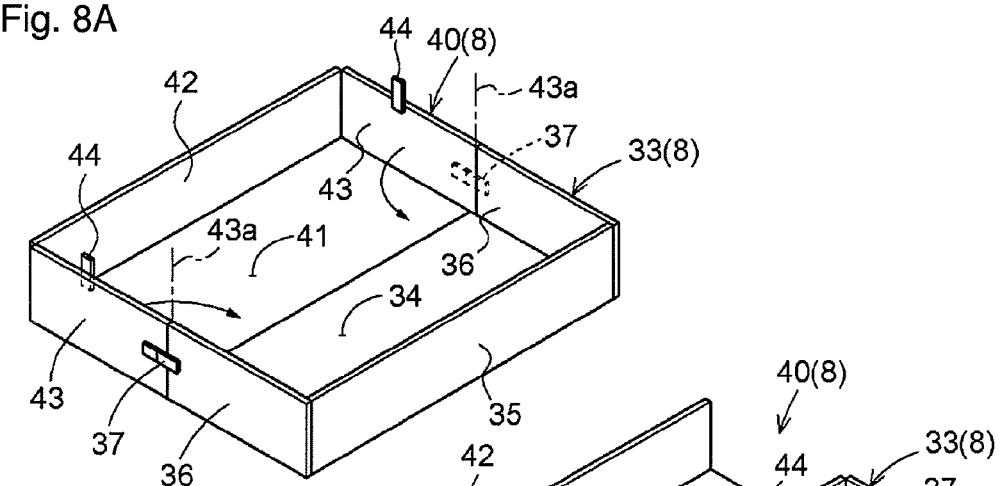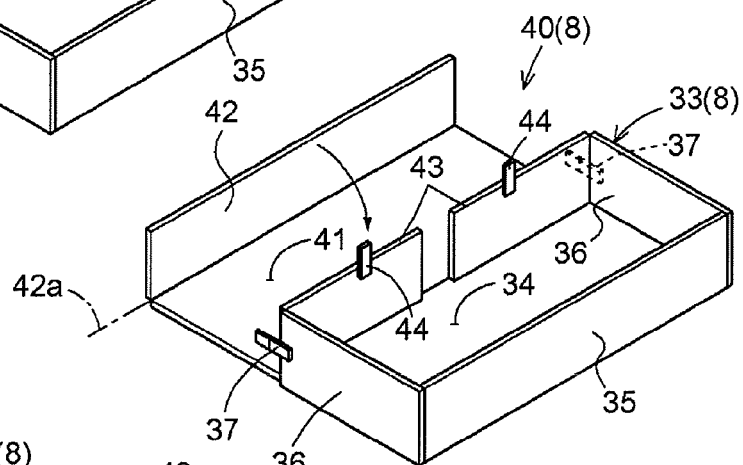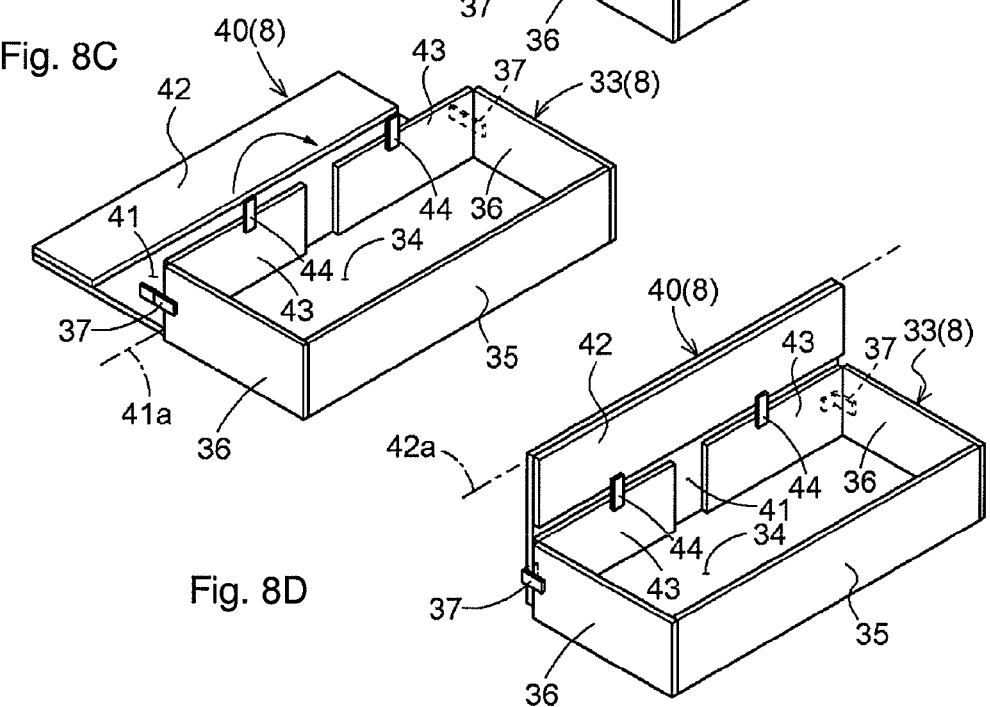

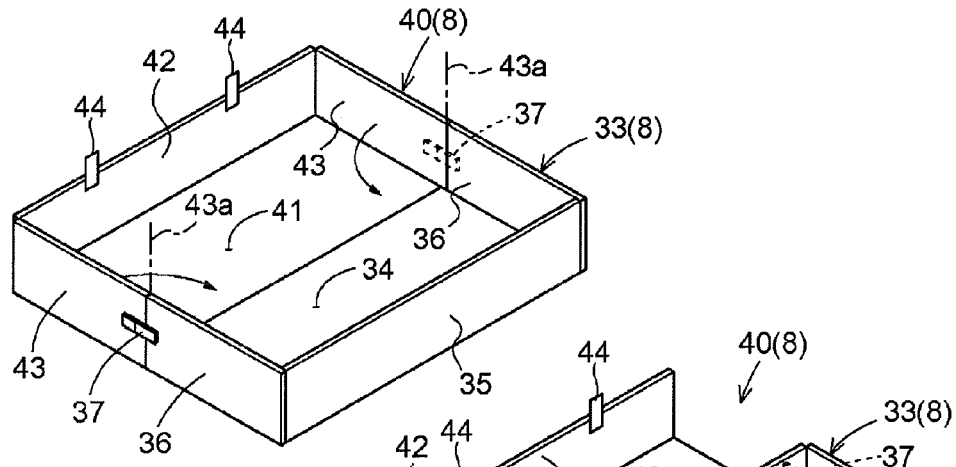
Fig. 9A
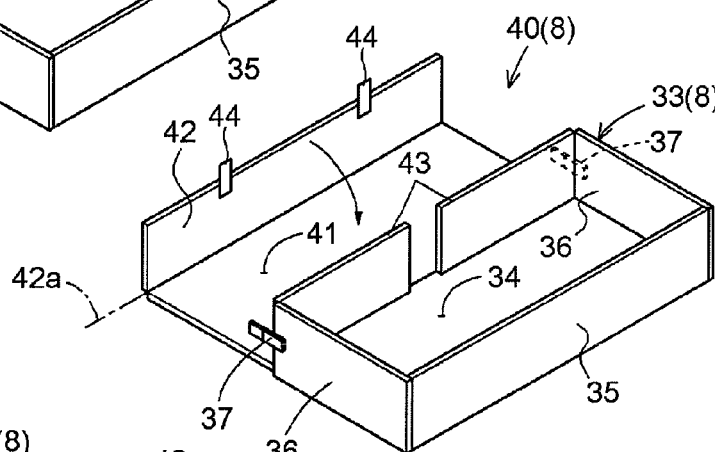
Fig. 9B
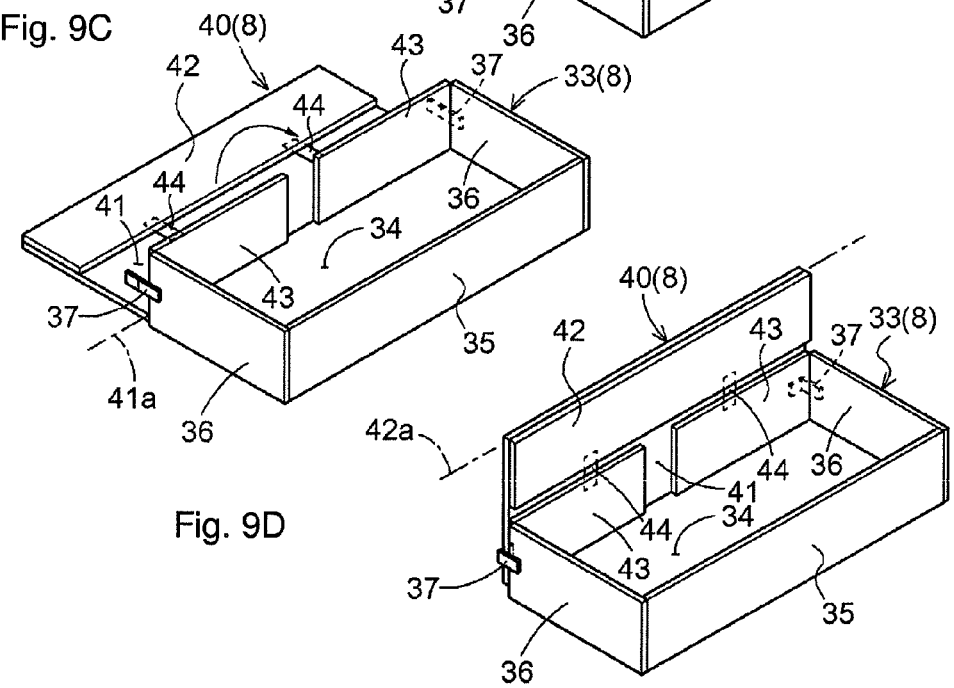
Fig. 9C
Fig. 9D

WORK VEHICLE

CROSS-REFERENCE TO RELATED APPLICATIONS

The present application claims priority under 35 U.S.C. §119 of Japanese Application No. 2014-201044, filed on Sep. 30, 2014, the disclosure of which is expressly incorporated by reference herein in its entirety.

BACKGROUND OF THE INVENTION

1. Field of the Invention

The prevent invention relates to a work vehicle equipped with a driver's seat provided in a front section of a vehicle body, a rear seat provided behind the driver's seat, and a carrier bed provided in a rear section of the vehicle body.

2. Description of Related Art

A work vehicle of this type is known from, for example, the work vehicle described in Japanese Patent Laid-open Publication 2011-116318. The work vehicle is capable of switching the rear seat between a seating mode with a two-row seating feature and a storage mode with a single row seating feature with the rear seat in a position anterior to the position in the seating mode.

In the work vehicle of this type, a position changing structure of the rear seat in a preferable manner is desired.

SUMMARY OF THE INVENTION

A work vehicle according to the invention includes a driver's seat provided in a front section of a vehicle body, a rear seat provided behind the driver's seat, and a carrier bed provided in a rear section of the vehicle body. The rear seat includes a seat portion, a back portion, and a linking member being supported by the vehicle body to allow switching between a seating mode and a storage mode, the seating mode arranging the back portion behind the seat portion in the seating mode, and the storage mode arranging the back portion in a position anterior to the position in the seating mode. The linking member acts as an arm rest arranging the linking member on an outer side, in the vehicle widthwise direction, of the back portion and the seat portion in the seating mode.

Thus, given the above mentioned configuration, the linking member arranged on outer side of the rear seat may be used as an arm rest. In this way, the linking member for changing positions of the back portion is used as an arm rest as well, and may provide a position changing structure of the rear seat in a preferable manner without a separate arm rest.

In the configuration above, a first end of the linking member is swingably supported on a vehicle body side in a lower part of the seat portion in the seating mode, and a second end of the linking member is swingably supported on a back portion side. In a side view, the linking member includes a first portion which the linking member rises upward from the first end side, and a second portion which extends slanting upward as the linking member is oriented rearward toward the back portion side from an end of the first portion. The second portion preferably acts as an arm rest.

In the above configuration, the second portion is arranged laterally to the rear seat, and extends slanting upward as the linking member is oriented rearward toward the back portion side from the end of the first portion. Accordingly, the second portion preferably acts as an arm rest.

In the above configuration, in a side view of the storage mode, the first portion of the linking member extends forward from a vehicle frame side as the second portion extends upward from a front end of the first portion, and the carrier bed is configured to be switchable between a first mode and a second mode, the first mode arranging the front end of the carrier bed behind a rear platform space, and the second mode arranging the front end of the carrier bed to enter the rear platform space. It is preferable that a front end of the carrier bed in the second mode enters a recess formed by the first portion and the second portion of the linking member. Additionally, in the above configuration, in a side view, it is preferable that the front end of the carrier bed in the second portion is located in front of a pivot axis center of the first end of the linking member in the storage mode.

In the above configuration, even if cross-direction ends of the carrier bed are arranged on an outer side, in the vehicle width direction, of the linking member, with the front end of the carrier bed entering the recess formed by the first portion and the second portion, the carrier bed can be arranged in a forward position. Consequently, even if a width of the carrier bed is wider to increase a capacity of the carrier bed, total length of the vehicle body can be shorter by arranging the carrier bed in a forward position.

In the above configuration, positions of the seat portion can be changed between the seating mode and the storage mode, and it is preferable that the seat portion in the storage mode is located below the back portion with a seating surface facing forward.

In the above configuration, the seat portion and the back portion can be stored compactly in a seating position.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 8A to 8D are explanatory diagrams illustrating convertible elements of the carrier bed; and FIGS. 9A to 9D are explanatory diagrams illustrating convertible elements of the carrier bed.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
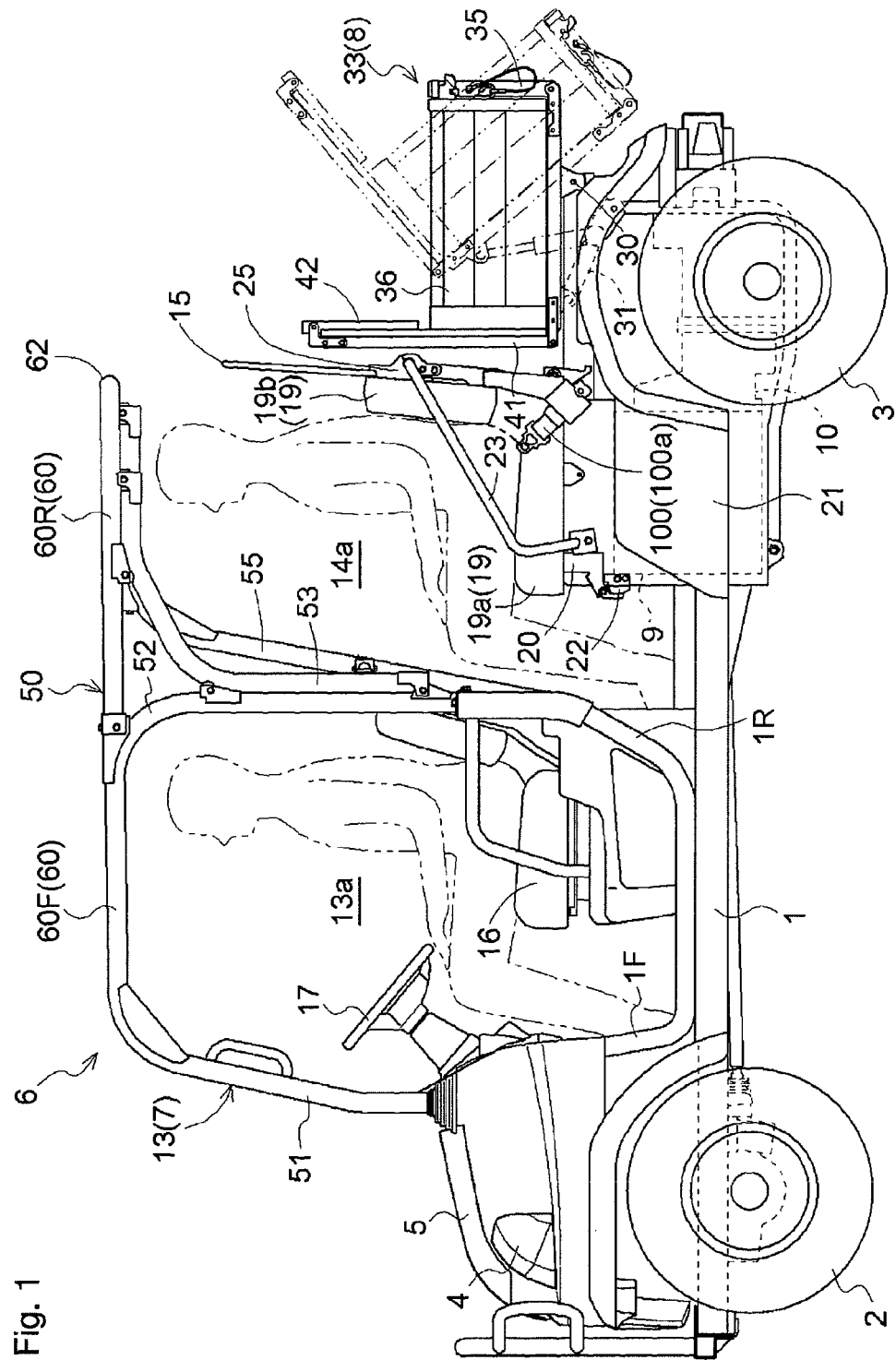
FIG. 1 is a side view illustrating an entire work vehicle while a carrier bed on the work vehicle is switched to a first mode.
Figure 3:
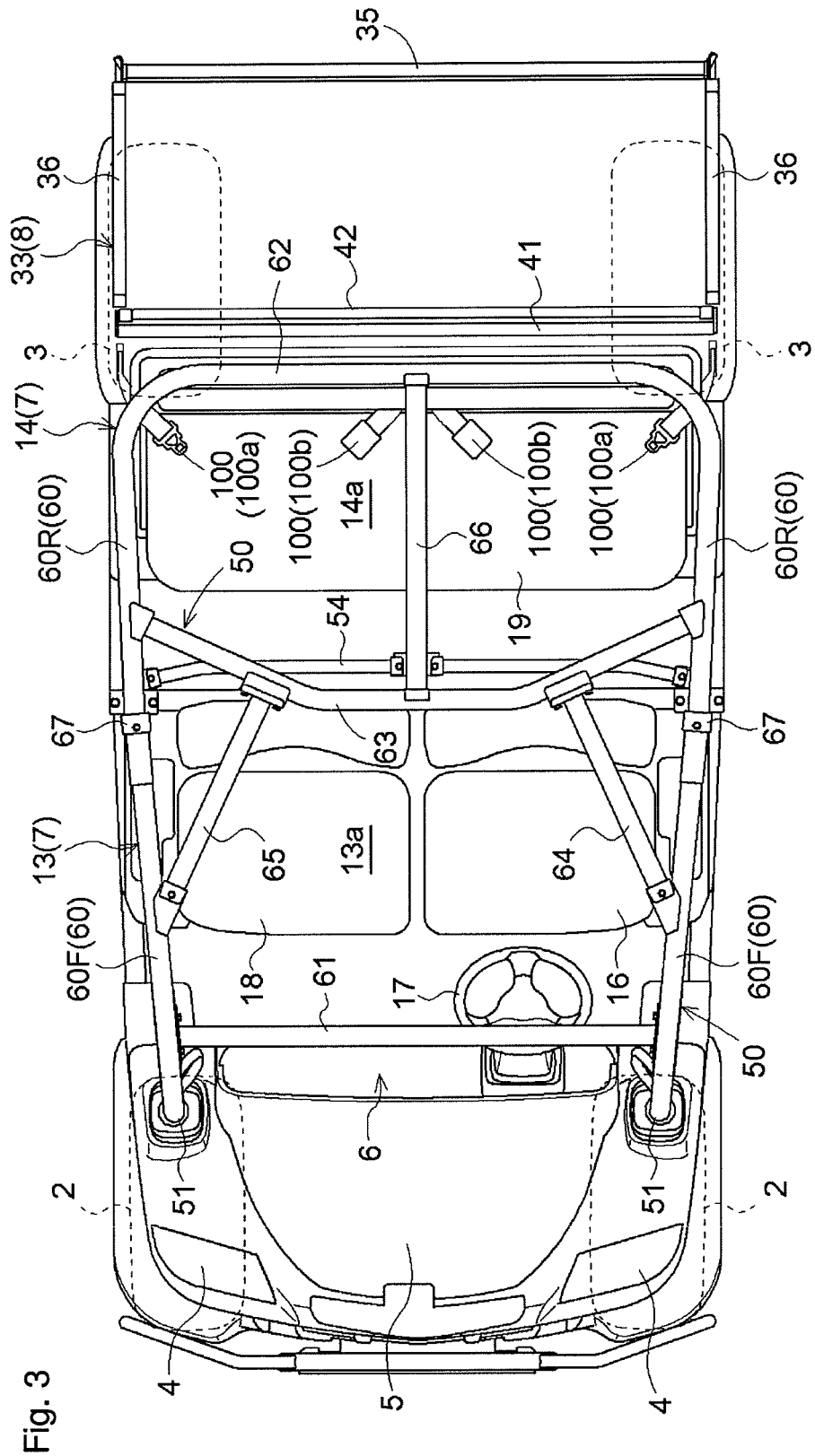
FIG. 3 is a top or plan view illustrating the entire work vehicle while the carrier bed on the work vehicle is switched to the first mode.

An embodiment of the present invention is described below with reference to the drawings. As illustrated in FIGS. 1 and 3, a work vehicle according to a first embodiment of the present invention is a traveling vehicle equipped with a pair of left and right front wheels 2 and a pair of left and right rear wheels 3 at the lower part of the vehicle body frame 1. The front end of the traveling vehicle is provided with a front cover 5 equipped with a pair of left and right headlamps 4. A platform 7 equipped with a Rollover Protective Structure (ROPS) 6 is provided behind the front cover or hood 5 of the traveling vehicle. A carrier bed 8 is provided at the rear of the traveling vehicle.

The traveling vehicle is equipped with an engine 9 located between the front wheels 2 and the rear wheels 3. The traveling vehicle is a four-wheel drive: the drive power output from the engine 9 is input to a traveling transmission 10, changing the vehicle speed; the drive power created after the speed change drives the front wheels 2 and the rear wheels 3.

Next, the platform 7 is described. In addition to the ROPS 6, the platform 7 is provided with a front platform 13 (corresponding to the "cockpit platform"), a rear platform 14, and a partition 15. The front platform 13 is placed in the front portion of the platform 7 with the ROPS 6 forming a front platform space 13a for carrying a passenger; the rear platform 14 is placed behind the front platform 13 with the ROPS 6 forming a rear platform space 14a for carrying the passenger(s). The partition 15 separates the front platform space 13a and the rear platform space 14a, from a rearward object loading space.

A driver's seat 16 is provided in the left region of the front platform space 13a. A steering wheel 17 is provided in front of the driver's seat 16 for manipulating the direction and operation of a pair of left and right front wheels 2. The front platform 13 is configured in the cockpit platform.

The front platform 13 is also equipped with a front seat 18 provided in the right region of the front platform space 13a; thus, the front platform 13 may carry two passengers. The driver's seat 16 and the front seat 18 are separate seats each equipped with the seat portion and the back portion individually constructed for the driver's seat and the front seat. The driver's seat 16 and the front seat 18 are configured to each freely slide forward and backward along a rail.

A rear seat 19 is provided in the rear platform 14. The rear seat 19 has a horizontally long seat so that the rear platform 14 may carry two passengers.

Figure 4:
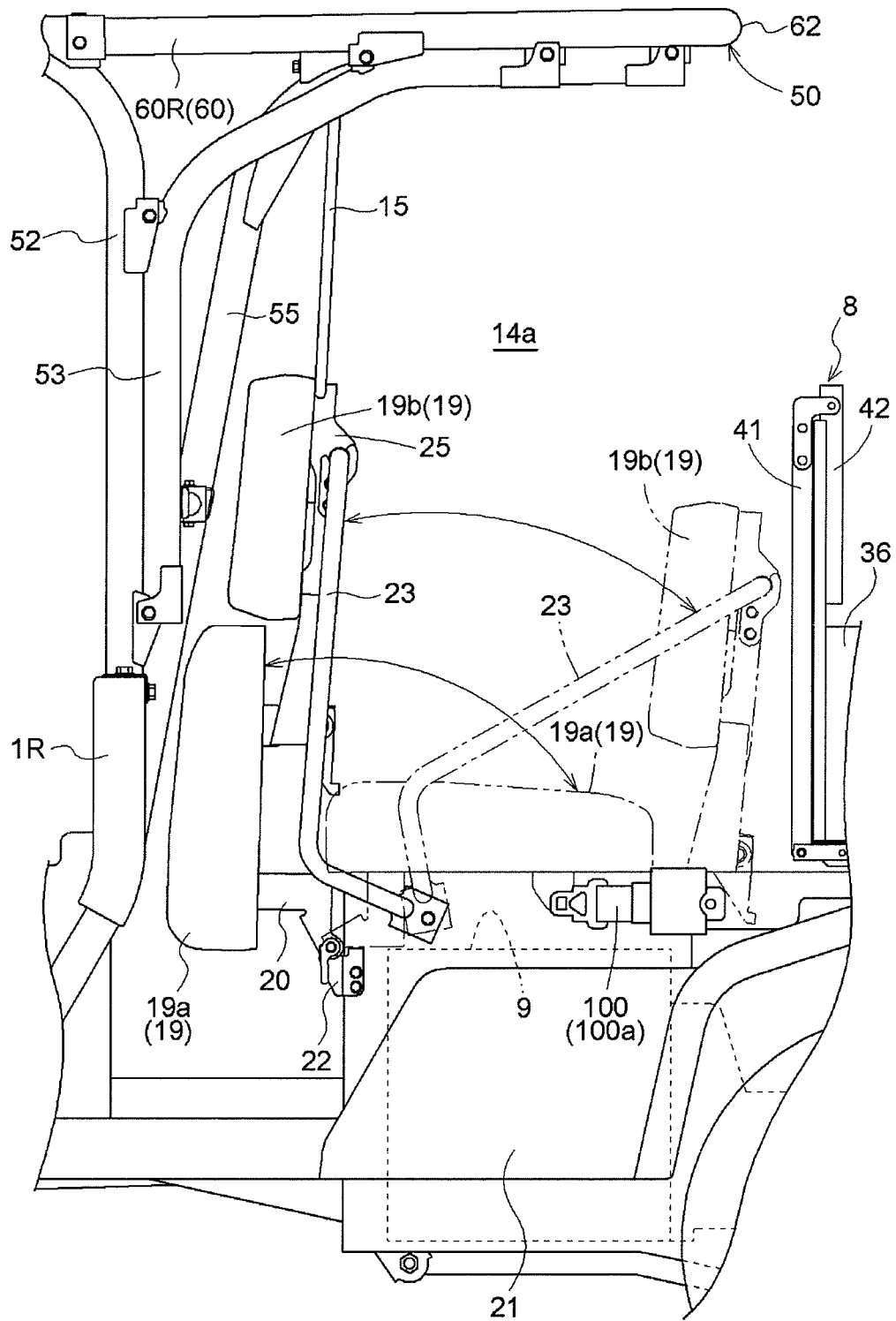
FIG. 4 is a side view illustrating position changes of a rear seat.

The rear seat 19 is configured to be freely convertible between two modes: a seating mode illustrated by a double dotted line in FIG. 4, and a storage mode illustrated by a solid line in FIG. 4. Specifically, the rear seat 19 is configured as follows.

The rear seat 19 is equipped with a horizontally long seat portion 19a and a horizontally long back portion 19b. The seat portion 19a is supported by a support 22 provided on a rear seat support 21, via an attachment 20 provided on the front end of the seat portion 19a. The seat portion 19a is configured to pivot forward or backward about the axis center of a coupling shaft that couples the attachment 20 and the support 22. The pivoting of the seat portion 19a forward or backward moves the seat portion 19a into a seating position established over a top panel of the rear seat support 21, and a storage position established on the rear side of the driver's seat 16 and the front seat 18. The seat portion 19a may be configured so that a maintenance access point provided in the top panel of the rear seat support 21 can be closed and opened by moving the seat portion 19a into the seating position and the storage position respectively. The rear seat support 21 houses the engine 9 and acts as an engine hood. That is, the seat portion 19a acts as a lid that covers the maintenance access port used when examining or repairing the inside of the rear seat support 21 or the engine 9.

The back portion 19b is coupled to the upper ends of a pair of left and right linking members 23 arranged on both sides widthwise of the rear seat 19. The lower ends of the pair of left and right linking members 23 (a first ends) are rotatably or pivotally supported on the rear seat support 21 in the lower part of the seat portion 19a. The upper ends of the pair of left and right linking members 23 (a second ends) are rotatably or pivotally coupled to a coupling member 25 provided on the rear side of the back portion 19b. When the back portion 19b is in the seating position, the pair of left and right linking members 23 are arranged slanting downward from the rear to the front thereof, and act as arm rests in this state. In other words, as seen the seating position in a side view, the linking member includes a portion of the linking member 23 rising upward from the first end side (a first portion) and an extending portion slanting upward as the linking member is oriented rearward toward the back portion side from an end of the first portion (a second portion). Therefore, the second portion acts as arm rests. The lower end of the partition 15 is coupled to the coupling structure 25 provided on the rear side of the back portion 19b. For instance, the partition 15 may be provided with a partition frame and a net-like member; the partition frame may be produced using frames horizontally-oriented and vertically-oriented relative to the vehicle body, coupled to produce the partition frame; and the net-like member tensioned between portions on the partition frame.

Namely, when the back portion 19b is moved forward or backward, the linking members 23 pivot front and back with the coupling point as a pivot relative to the rear seat support 21. Additionally, the partition 15 moves forward and backward together with the coupling member 25 in the rear platform space 14a. When the back portion 19b is in the storage mode, as seen in a side view in FIG. 4, the first portion of the linking member 23 extends forward from the vehicle frame side as the second portion is in the position extending upward from the front end of the first portion. Thus, the back portion 19b moves between a seating position established above the seating position of the seat portion 19a, and the storage position established above the storage position of the seat portion 19a.

As illustrated in FIGS. 1 and 4, the rear seat 19 is held in the seat location toward the rear of the rear platform space 14a, and placed in the seating mode by moving the seat portion 19a and back portion 19b thereof to the seating position and securing the rear seat 19 at the seating position with a locking mechanism (not shown). Placing the rear seat 19 in the seating mode provides a two-row seating feature in the work vehicle with the front platform 13 and the rear platform 14. Furthermore, switching the rear seat 19 to the seating mode moves the partition 15 to a rear partition position. The rear partition position is for the two-row seating feature, where the rear partition position is at the rear end of the rear platform 14. Namely, the rear partition position partitions off the rear platform space 14a from the object loading space behind the rear platform space 14a.

Figure 2:
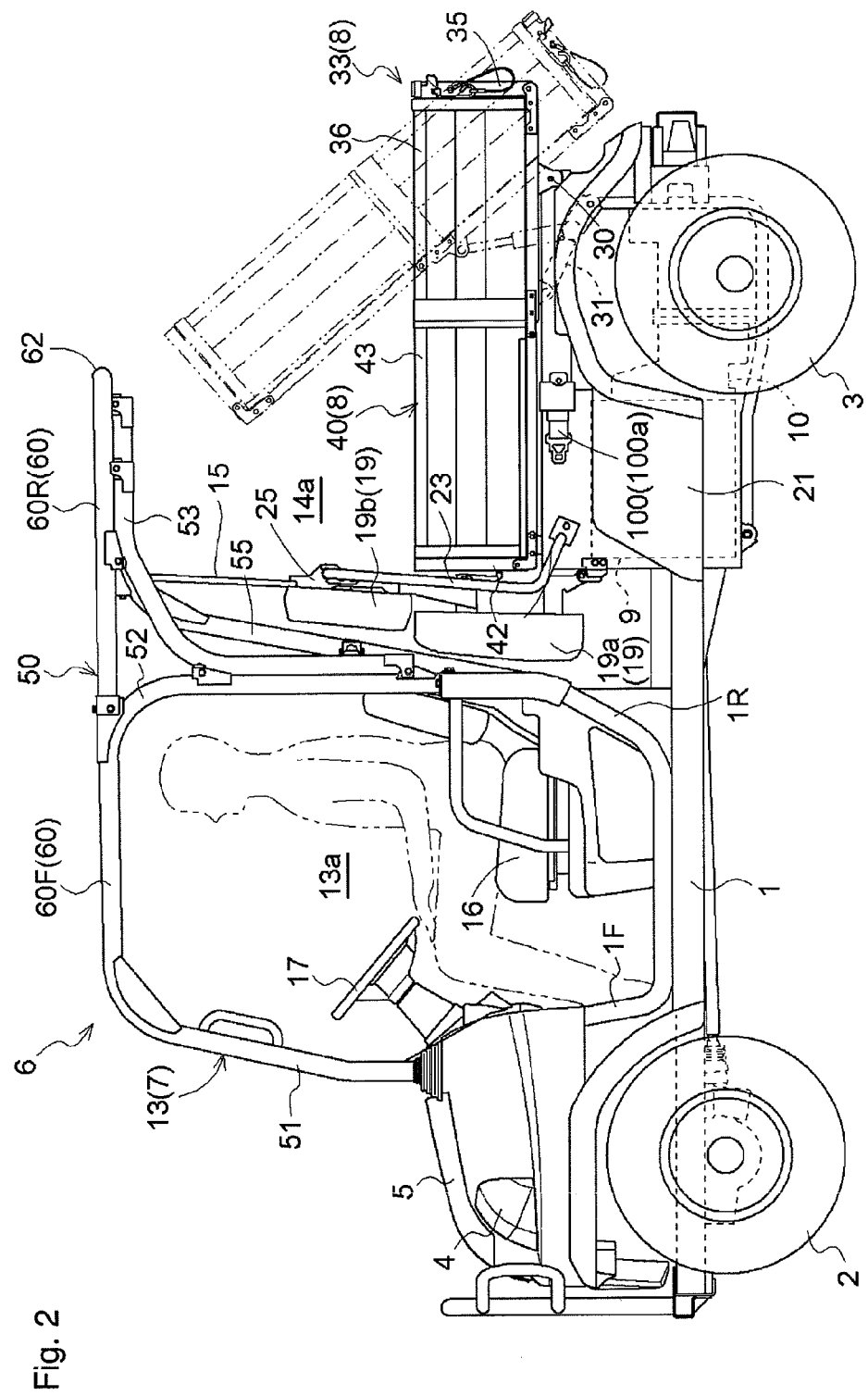
FIG. 2 is a side view illustrating the entire work vehicle while the carrier bed on the work vehicle is switched to a second mode.

As illustrated in FIGS. 2 and 4, the rear seat 19 is held in the location in front of the seat location in the rear platform space 14a, and placed in the storage mode by moving the seat portion 19a and the back portion 19b to the storage position and securing the rear seat 19 at the storage position with a locking mechanism (not shown). Placing the rear seat 19 in the storage mode creates a single row of seating in the work vehicle where passengers can board only the front platform 13, out of the front platform 13 and the rear platform 14. Furthermore, switching the rear seat 19 to the storage mode moves the partition 15 to a forward partition position. The forward partition position is for the single-row seating feature, where the forward partition position is toward the front of the rear platform space 14a. Namely, the forward partition position partitions off the front platform space 13a from the object loading space behind the front platform space 13a.

As illustrated in FIGS. 1, 2, 3, and 4, the rear seat 19 is provided with a seatbelt(s) 100. The seatbelt 100 is provided on a member on the vehicle frame side. Therefore, the seatbelt 100 does not move with the rear seat 19 when the rear seat 19 changes positions (refer to FIG. 2). In the embodiment, as illustrated in FIG. 3, a main seatbelt body 100a is provided on the outer section of the vehicle body, and a seatbelt locking part 100b for engaging the seatbelt is provided on the inner section of the vehicle frame. The main seatbelt body 100a may be stored in a reel and the like. The rear seat 19 may be configured to slide forward and backward along a rail structure and the like. The similar seatbelt is provided for the driver's seat 16 and the front seat 18 (not shown). These seatbelts are also provided on members of the vehicle frame side.

The carrier bed 8 will now be described. As illustrated in FIG. 1, the carrier bed 8 is supported on the vehicle body to pivot vertically via a dumping fulcrum shaft 30. The dumping fulcrum shaft 30 is arranged near the rear end of the carrier bed 8 and is horizontally-oriented relative to the vehicle. An elevation control cylinder 31 is provided extending between the under surface of the carrier bed 8 and the vehicle body frame 1; the elevation control cylinder 31 lifts and lowers the carrier bed 8 so that the carrier bed 8 may move from a loading position through to a dumping position. The carrier bed 8 is horizontal or substantially horizontal to the vehicle body in the loading position, and the front end of the carrier bed 8 is raised high above the vehicle body in the dumping position.

Figure 7:
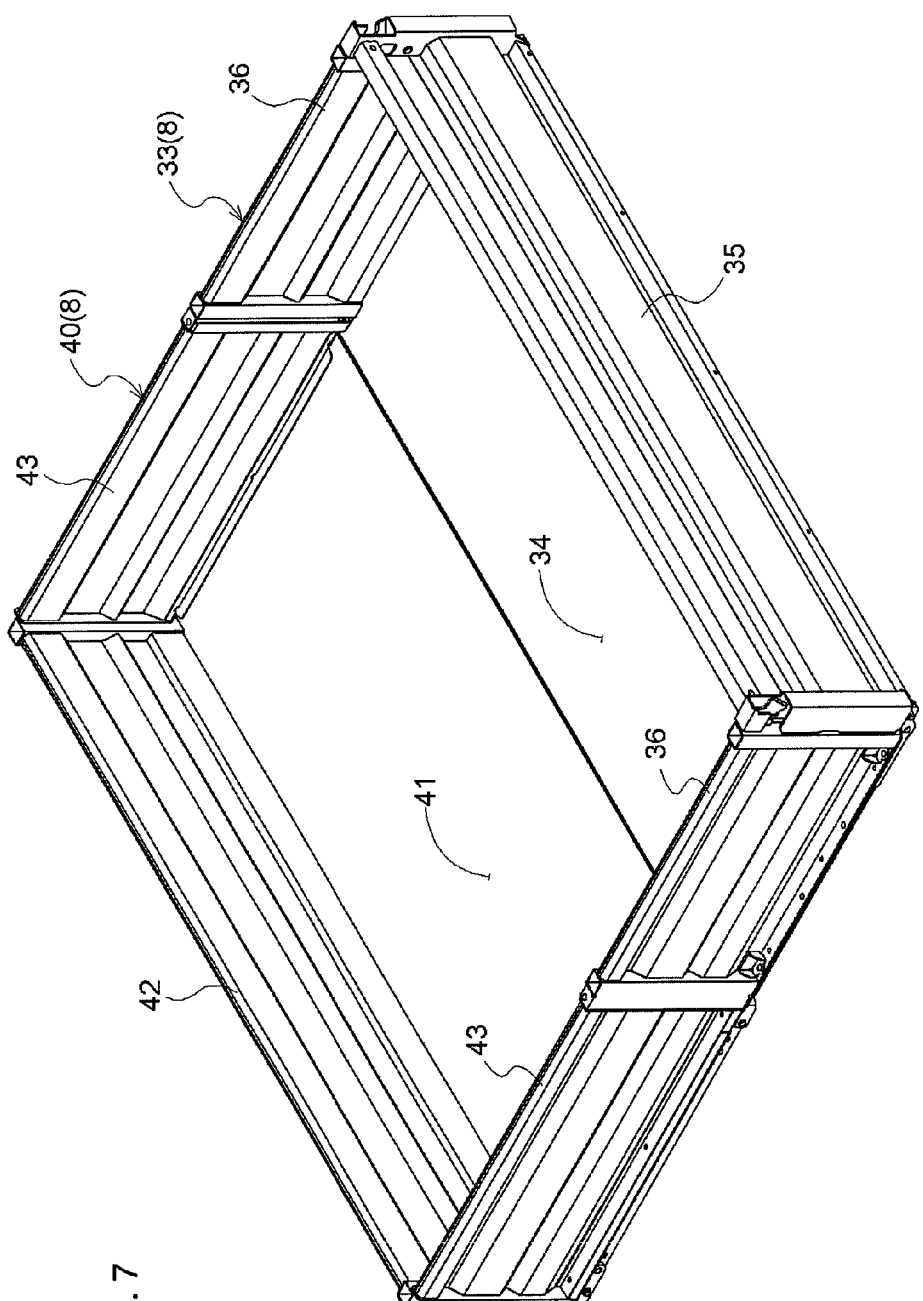
FIG. 7 is a perspective view illustrating the carrier bed in the second mode.

As illustrated in FIGS. 2 and 7, the carrier bed 8 is equipped with a main bed 33 and an expanding bed 40. The main bed 33 includes a bottom panel 34 having an under surface thereof coupled to the elevation control cylinder 31; and the expanding bed 40 includes an expanding bottom panel 41 having a rear end thereof coupled to the front end of the bottom panel 34.

In addition to the bottom panel 34, the main bed 33 is equipped with a back panel 35 coupled to the rear end of the bottom panel 34 and side panels 36 coupled to both side ends of the bottom panel 34.

Figure 6:
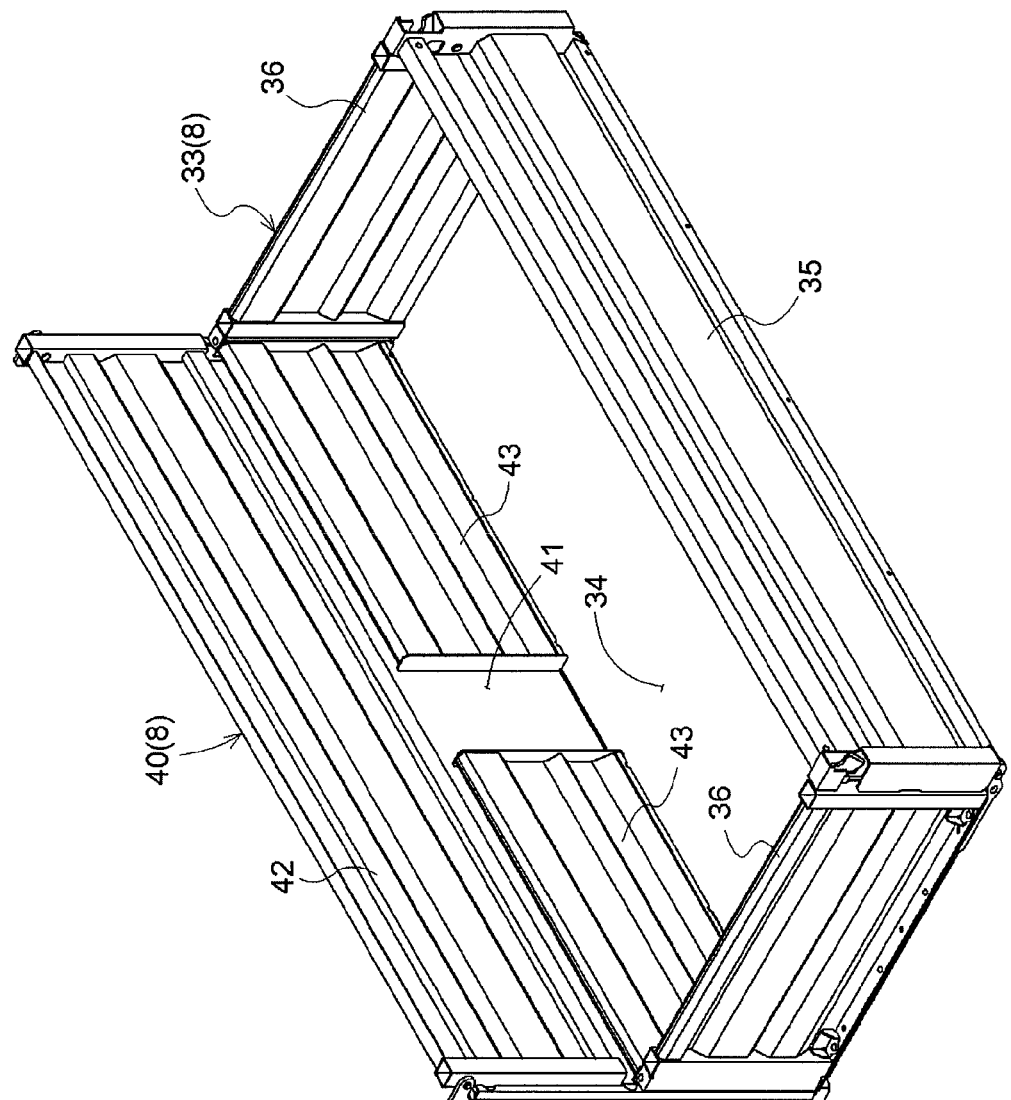
FIG. 6 is a perspective view illustrating the carrier bed in the first mode.

In addition to the expanding bottom panel 41, the expanding bed 40 includes a front panel 42 and expanding side panels 43. The front panel 42 is coupled to the front end of the expanding bottom panel 41 to pivot vertically about an axis center 42a (refer to FIG. 8D); and the expanding side panels 43 are coupled to the front ends of the left and right side panels 36 on the main bed 33 to pivot laterally of the carrier bed about the axis center 43a (refer to FIG. 8A). The expanding bottom panel 41 is configured to pivot vertically about an axis center 41a (refer to FIG. 8C) relative to the bottom panel 34 of the main bed 33; and the expanding bed 40 is configured to switch between a collapsed mode illustrated in FIGS. 1 and 6, and an expanded mode illustrated in FIGS. 2 and 7.

FIGS. 8A to 8D are explanatory diagrams illustrating convertible elements of the carrier bed 8. FIG. 8A illustrates the expanded mode of the expanding bed 40. FIG. 8D illustrates the collapsed mode of the expanding bed 40. As illustrated in FIG. 8B, the left and right expanding side panels 43 may be pivoted toward the inside of the carrier bed to fold along the front edges of the bottom panel 34. In addition, stop members (not shown) limit the pivoting of the left and right expanding side panels 43 while the expanding side panels 43 are at right angles or substantially right angles to the side panels 36. Next, as illustrated in FIG. 8C, the front panel 42 is pivoted downward towards the upper surface of the expanding bottom panel 41 to a collapsed position where the front panel 42 overlaps with the upper surface of the expanding bottom panel 41. As illustrated in FIG. 8D, the expanding bottom panel 41 is pivoted upward towards the expanding side panels 43, which are collapsed. The expanding bed 40 is switched over to a collapsed mode when the expanding bed 40 collapses and overlaps with the outer surfaces of the expanding side panels 43.

The expanding bed 40 may be switched to the collapsed mode to convert the carrier bed 8 to a first mode. Namely, collapsing the expanding bed 40 reduces the length of the carrier bed 8. When the expanding bed 40 is in the collapsed mode, the left and right expanding side panels 43 are arranged more inward of the carrier bed than the expanding bottom panel 41. Therefore, the length of the carrier bed 8 in a first mode can be much shorter compared to adopting a collapsed mode having the left and right expanding side panels 43 arranged more outward of the carrier bed than the expanding bottom panel 41, since the length is decided according to the board thickness of the expanding side panels 43.

As illustrated in FIGS. 8A to 8D, the carrier bed 8 may be further provided with left and right locking mechanisms 37 that secure the expanding bottom panel 41 and the left and right side panels 36 while the carrier bed 8 is in the collapsed mode. Additionally, stop members 44 are provided on the upper end of each left and right expanding side panels 43. The stop members 44 limit the upward rotation of the front panel 42 about the axis center 42a. That is, when the front panel 42 begins to rotate upward about the axis center 42a, the front panel 42 comes into contact with the stop members 44 thereby maintaining the front panel 42 in that position. With this configuration, placing locking mechanisms 37 between the expanding bottom panel 41 and the left and right side panels 36 can maintain the position of the front panel 42 in a simple configuration, without a complicated locking mechanism. In addition, as illustrated in FIGS. 9A to 9D, the stop members 44 may be provided on the upper end of the front panel 42. In this case, as illustrated in FIG. 9D, in a first state the stop members 44 are sandwiched between the expanding bottom panel 41 and the expanding side panels 43, thereby maintaining the position of the front panel 42.

As illustrated in FIGS. 1 and 3, switching the carrier bed 8 to a first mode reduces the length of the carrier bed 8, positioning the front end of the carrier bed 8 behind the rear platform space 14a, and providing the work vehicle with a two-row seating feature.

As illustrated in FIG. 8C, the expanding bottom panel 41 is placed at an extended position where the expanding bottom panel 41 is pivoted downward toward the front to lay flatly or substantially flatly alongside the bottom panel 34. Next, as illustrated in FIG. 8B, the front panel 42 is placed at an extended position where the front panel 42 is pivoted upward from the front end of the expanding bottom panel 41. Subsequently, as illustrated in FIG. 8A, the expanding bed 40 can be switched to an expanded mode when the left and right expanding side panels 43 are placed at an extended position where the left and right expanding side panels 43 are pivoted toward the outside of the carrier bed, to lay flatly or substantially flatly alongside the side panels 36.

The expanding bed 40 may be switched to an expanded mode to convert the carrier bed 8 to the second mode. Namely, expanding the expanding bed 40 extends the length of the carrier bed 8.

As illustrated in FIG. 2, when the carrier bed 8 is converted to the second mode, the front end of the carrier bed 8 enters the rear platform space 14a (in other words, when viewed from the top of the carrier bed 8, overlaps with the later described rearward overhanging frame) to expand the length of the carrier bed 8. At this point, the rear seat 19 is converted to the storage mode, and the partition 15 moves to the forward partition position creating a single-row seating feature to allow the front end of the carrier bed 8 to enter the rear platform space 14b. The front end of the carrier bed 8 enters the empty seat location (the location at which the rear seat 19 is situated when the rear seat 19 is in seating mode) in the rear platform space 14a after switching the rear seat 19 to the storage mode. When the back portion 19b is in the storage mode, as seen in a side view, the first portion of the linking member 23 extends forward from the vehicle frame side and the second portion extends upward from the front end of the first portion. The front end of the carrier bed 8 enters into a recess formed by the first portion and the second portion the linking mechanism 23. Moreover, the front end of the carrier bed 8 is located in front of a rotation shaft on the seat support 21 side of the linking member 23. In this way, an entire length of the vehicle body can be shorter by locating the carrier bed 8 in front even in a situation when the width of the carrier bed 8 is wider than that of the linking members 23 (refer to FIG. 3).

Figure 5:
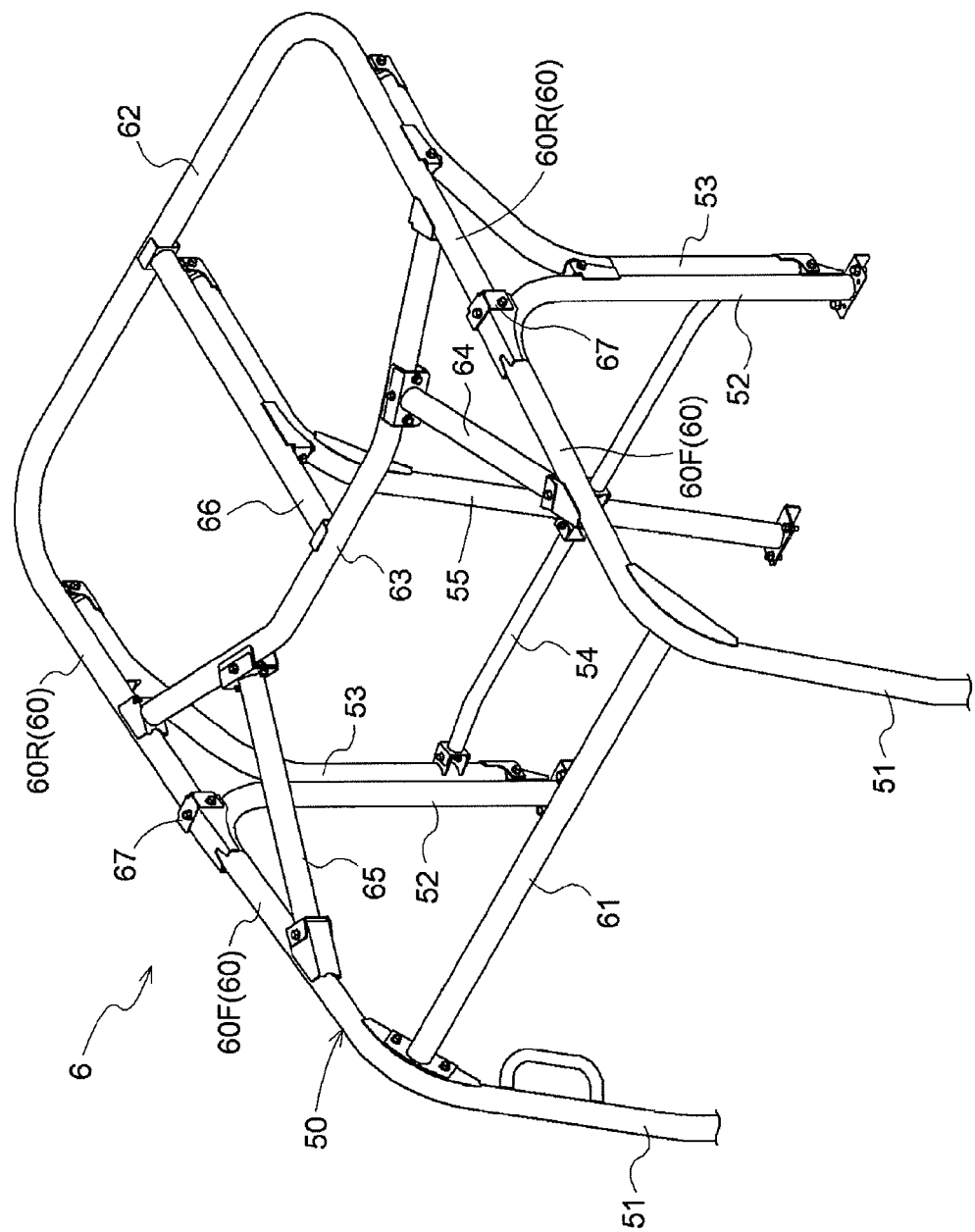
FIG. 5 is a perspective view illustrating a rollover protective structure (ROPS)

Next, ROPS 6 is described. As illustrated in FIGS. 1, 3, and 5, the ROPS 6 is provided with an upper frame 50, a pair of left and right front supporting columns 51, and a pair of left and right rear supporting columns 52. The upper frame 50 is located above the front platform space 13a and the rear platform space 14a lengthwise of the vehicle. The pair of vertically-oriented front supporting columns 51 is arranged with one column on each outer front end widthwise of the vehicle at the front end of the front platform space 13a; and the pair of vertically-oriented rear supporting columns 52 is arranged with one column on each outer end widthwise of the vehicle, between the front platform 13 and the rear platform 14. The ROPS 6 is constructed to not overlap with the first mode or second mode carrier bed 8 when the vehicle is viewed from the side. Additionally, the upper frame 50 is projected rearward passed the rear supporting columns 52 at the similar height level of the rear supporting columns 52.

The front supporting columns 51, the rear supporting columns 52, and the reinforcing support column 55 are described in detail. The upper ends of the pair of left and right front supporting columns 51 are individually coupled on both widthwise side ends at the front end of the upper frame 50; the lower ends of the pair of left and right front supporting columns 51 are individually coupled at the upper ends of vertically-oriented front supporting frames 1F provided on the vehicle body frame 1. The pair of left and right front supporting columns 51 supports the front ends of the upper frame 50, and the front end of the ROPS 6 is supported on the vehicle body frame 1.

The upper ends of the pair of left and right rear supporting columns 52 are individually coupled on both side ends at the middle portion of the upper frame 50; the lower ends of the pair of left and right rear supporting columns 52 are individually coupled at the upper ends of vertically-oriented rear supporting frames 1R provided on the vehicle body frame 1. The pair of left and right rear supporting columns 52 supports the middle portion of the upper frame 50, and the rear end of the ROPS 6 is supported on the vehicle body frame 1.

The front ends and rear ends of the front supporting frame 1F and rear supporting frame 1R, respectively, on the left and the right side of the vehicle are oriented vertically relative to the vehicle body. The middle portions between the front and rear of each front supporting frame 1F and rear supporting frame 1R on the left and right side of the vehicle are oriented lengthwise of the vehicle body and curved to form a single frame component.

As illustrated in FIG. 2, the left and right rear supporting columns 52 are located in front of the front end of the carrier bed 8 when the carrier bed 8 is in the second mode. As illustrated in FIG. 1, the left and right rear supporting columns 52 are located in front of the rear seat 19 while the rear seat is in a seating mode, facilitating passage between the rear seat 19 and the rear supporting columns 52.

As illustrated in FIGS. 1 and 5, reinforcing frames 53 are coupled at the left and right rear supporting columns 52 spanning from the lower end of the rear supporting columns 52 to the location behind where the upper frame 50 is coupled to the rear supporting columns 52. A horizontal coupling frame 54 is coupled at the lower ends of the left and right reinforcing frames 53.

Further, as illustrated in FIGS. 1, 2, and 4, the lower end of the reinforcing support column 55 is supported on a side of the vehicle body frame 1 at substantially the same location lengthwise as the rear supporting columns 52. The reinforcing support column 55 rises from the lower end and extends upward with an inclination so as to be placed progressively rearward, with a predetermined region of the upper end extending along a rear-center coupling frame 66 (later described), and is coupled to the rear-center coupling frame 66. In the embodiment, the rear-center coupling frame 66 is a single component provided in the center widthwise of the vehicle body.

Next, the upper frame 50 is described in detail. As illustrated in FIGS. 3 and 5, the upper frame 50 is provided with a pair of left and right lengthwise main frames 60; a horizontal front coupling frame 61; a horizontal rear coupling frame 62 (corresponding to a "first coupling frame"); and a horizontal center coupling frame 63 (corresponding to a "second coupling frame"). The front coupling frame 61 couples the front ends of the left and right main frames 60; the rear coupling frame 62 couples the rear ends of the left and right main frames 60; and the center coupling frame 63 couples the middle portion lengthwise of the left and right main frames 60.

The section close to the left end of the center coupling frame 63 and the front frame 60F of the left main frame 60 are coupled together by an inclined left coupling frame 64 (corresponding to a "third coupling frame"). The section close to the right end of the center coupling frame 63 and the front frame 60F of the right main frame 60 are coupled together by an inclined right coupling frame 65 (corresponding to a "third coupling frame"). The center portions of the center coupling frame 63 and the rear coupling frame 62 are coupled together by a lengthwise oriented rear-center coupling frame 66 (corresponding to "fourth coupling frame"). In addition, the pair of left and right front frames 60F may be coupled by the center coupling frame 63; further, the center coupling frame 63 and the pair of left and right rear frames 60R may be coupled by the left coupling frame 64 and the right coupling frame 65.

The left and right main frames 60 are configured by coupling the front frame 60F and the rear frame portion 60R of the main frames 60 with a coupling 67. The sections of the main frames 60 in front of the locations where the rear supporting columns are coupled configure the front frames 60F; additionally the sections of the main frames 60 behind the locations where the rear supporting columns are coupled configure the rear frames 60R. Further, the front frames 60F and the rear frames 60R may be configured by a single frame material.

The front supporting columns 51, the rear supporting columns 52, and the front frames 60F of the main frames 60 on the left and right sides of the ROPS 6 are respectively configured from a single frame material. That is, a single frame material is bent such that the front ends thereof configure the front supporting columns 51, the rear ends configure the rear supporting columns 52, and the center portion becomes the front frames 60F near the front of the main frames 60. The front supporting columns 51, the rear supporting columns 52, and the front frames 60F on the main frames 60 may be configured by coupling together a plurality of frame materials. The left and right rear frames 60R of the main frames 60 and the rear coupling frame 62 are configured from a single frame material. That is, a single frame material is bent such that both ends thereof configure the rear frames 60R, and the center portion configures the rear coupling frame 62. The left and right rear frames 60R and the rear coupling frame 62 of the main frames 60 may be configured by coupling together a plurality of frame materials.

In this manner, the rear frames 60R and the rear coupling frame 62 extend rearward from behind the rear supporting columns 52 at the same height as the upper end of the rear supporting columns. In other words, in the present embodiment, the rear frames 60R and the rear coupling frame 62 configure the rearward overhanging frame. In addition, the reinforcing support column 55 is supported by the vehicle body frame 1 on the lower end and is coupled to the rear-center coupling frame 66 at the upper end. Hereby, the reinforcing support column 66 supports the rearward overhanging frame.

Other Embodiments (1) The above-mentioned embodiment exemplifies adopting the expanding bed 40 with the collapsed structure to allow switching the first mode and the second mode of the carrier bed 8; however, an embodiment may adopt an expanding bed which can adjust the projecting length in front of the main bed 33, and the main bed 33 is supported so as to slide in a front-back direction.

(2) The above-mentioned embodiment exemplifies adopting a configuration of the carrier bed 8 switching between the first mode and the second mode by modifying the length of the carrier bed 8; however, the embodiment may be configured such that the carrier bed 8 switches between the first mode and second mode by sliding the entire carrier bed 8 front and back with respect to the vehicle body without the length modification of the carrier bed 8. In addition, the carrier bed 8 does not necessarily need to be switchable between the first mode and the second mode.

(3) The above-mentioned embodiment exemplifies adopting a configuration where the rear seat 19 switches to a storage mode and the front end of the carrier bed 8 enters the empty seat location created thereby; however, the embodiment may be configured such that the front end of the carrier bed 8 enters the rear platform space 14a while the rear seat 19 is still in the seating mode.

(4) The above-mentioned embodiment exemplifies adopting a configuration where switching the rear seat 19 to and from the seating mode and the storage mode moves the partition 15 forward and backward; however, the embodiment may be configured such that the forward and backward movement of the partition 15 and switching of the rear seat 19 to and from the seating mode and the storage mode are carried out separately. In this case, for example, the partition 15 can be supported by the ROPS and the vehicle body frame via a rail structure and a linking member. In addition, mounting positions of the partition 15 can be modified by providing separate mounting positions of the partition 15 for the seating mode and for the storage mode.

(5) The frame structure of the ROPS 6 illustrated in the above-mentioned embodiment is merely one example. If the ROPS is provided with a rearward overhanging frame then a variety of frame structures may be adopted. For example, a frame structure may be adopted that excludes a portion or all of, for example, the reinforcing frames 53, the reinforcing support column 55, the rear coupling frame 62, the center coupling frame 63, the left coupling frame 64, the coupling frame 65, and the rear-center coupling frame 66; or frame elements besides those above mentioned, and the like. Finally, the rearward overhanging frame may be configured by a section of the reinforcing frames 53 extending behind the reinforcing frames 53 and the like; the rearward overhanging frame may also be configured by frame elements other than the rear frames 60R and the rear coupling frame 62.

The present invention may be applied to a variety of work vehicles.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle comprising:
a driver's seat arranged in a front section of a vehicle body;
a rear seat arranged behind the driver's seat and comprising:
   a seat portion;
   a back portion; and
   at least one link member arranged on a lateral side of the rear seat and being structured and arranged to allow switching between a seating mode and a storage mode, wherein, in said seating mode, the back portion is positioned behind the seat portion, and wherein, in said storage mode, the back portion is positioned in a more forward position; and
a carrier bed arranged in a rear section of the vehicle body.

2. The work vehicle according to claim 1, wherein a portion of said link member functions as arm rest when the rear seat is positioned in the seating mode.

3. The work vehicle according to claim 1, wherein
a first end of said link member is swingably or pivotally coupled to a portion of the vehicle body arranged below the seat portion when in the seating mode,
a second end of said link member is swingably or pivotally coupled at a location that is behind the back portion, and
a portion of said link member includes a bend.

4. The work vehicle according to claim 3, wherein in the seating mode the bend is defined by:
a first portion that extends upward from the first end, and
a second portion that is angled upward and backward.

5. The work vehicle according to claim 4, wherein the second portion functions as the arm rest.

6. The work vehicle according to claim 3, wherein the carrier bed is capable of assuming plural configuration modes which include a first mode and a second mode, and wherein, in said first mode, the rear seat is in the seating mode and in the second mode, the rear seat is in the storage mode.

7. The work vehicle according to claim 6, wherein, in the first mode, a front end of the carrier bed is located behind a rear platform space containing the rear seat.

8. The work vehicle according to claim 7, wherein, in the second mode, the front end of the carrier bed at least one of:
extends into the rear platform space, and
is position adjacent the bend of the link member.

9. The work vehicle according to claim 8, wherein, in the storage mode, the second portion of the link member assumes a more upward orientation than in the seating mode.

10. The work vehicle according to claim 4, wherein in the storage mode, the second portion assumes a more upward orientation than in the seating mode.

11. The work vehicle according to claim 6, wherein, in the second mode, a front end of the carrier bed is located in front of a pivot axis of the first end of the link member.

12. The work vehicle according to claim 1, wherein, in the storage mode, the seat portion is located below the back portion and a seating surface of the seat portion faces in a forward direction.

13. The work vehicle according to claim 1, further comprising an upward extending partition disposed between the carrier bed and the rear seat.

14. The work vehicle according to claim 13, wherein the upward extending partition extends upward from the back portion of the rear seat.

15. A work vehicle comprising:
a front seat arranged on a vehicle body;
a carrier bed arranged in a rear section of the vehicle body;
a rear seat arranged between the front seat and the carrier bed and comprising:
a seat bottom;
a seat back; and
at least one link coupled to a lateral side of the rear seat and being structured and arranged to allow the rear seat to move between a seating mode and a storage mode,
wherein, in said seating mode, a portion of the link can function as an arm rest, and
wherein, in said storage mode, the seat bottom assumes a generally vertical position, the seat back is positioned above the seat bottom, and a space is disposed behind the rear seat which can accommodate a portion of the carrier bed.

16. A work vehicle comprising:
a front seat arranged on a vehicle body;
a carrier bed mounted to the vehicle body and comprising at least one of:
an expandable volume configuration; and
a front end having folding panels;
a rear seat arranged between the front seat and the carrier bed and comprising:
a seat bottom;
a seat back; and
at least one link having a first end pivotally coupled below the seat bottom and a second end pivotally coupled to the seat back,
wherein the rear seat is movable between a seating mode and a storage mode,
wherein, in said storage mode, the seat bottom assumes a generally vertical position and a space is disposed behind the rear seat which can accommodate a portion of the carrier bed.

* * * * *